Patented Jan. 3, 1950

2,493,374

UNITED STATES PATENT OFFICE 2,493,374

HYDROGENATED DIMERS OF ANGELICA LACTONE

Hans Wolff and Wendell W. Moyer, Decatur, Ill., assignors to A. E. Staley Manufacturing Company, Decatur, Ill., a corporation of Delaware No Drawing. Application July 31, 1946, Serial No. 687,528

3 Claims. (Cl. 260—344)

This invention relates to dilactones. More specifically, it relates to isomeric saturated dilactones of molecular formula $C_{10}H_{14}O_4$ that may be obtained by hydrogenating certain dimers of angelica lactone. Provision of the novel dilactones is a principal object of the invention.

Other objects of the invention will in part be obvious and will in part appear hereinafter.

The invention accordingly comprises a product possessing the features, properties, and the relation of components which will be exemplified in the product hereinafter described and the scope of the application of which will be indicated in the claims.

In a copending application filed July 31, 1946, Serial No. 687,527, there is described the preparation of two dimers of angelica lactone. These dimers are white crystalline compounds of molecular formula $C_{10}H_{12}O_4$ and each contains one ethylenic double bond conjugated with a carbonyl group. Both are dilactones. One of the dimers has a melting point of about 83 to 84° C.; the melting point of the other dimer is about 87 to 88° C. The higher melting dimer is considerably less soluble in ethanol than the lower melting dimer. In our copending application above referred to it is stated that angelica lactone can be dimerized by bringing it into contact under substantially anhydrous conditions with a selected catalyst having alkaline or potentially alkaline characteristics. Choice of reaction temperature and contact time for optimum results depend in part upon the nature and proportion of the catalyst used. The proportion of catalyst required for significant rate of dimerization is small, from 0.5 to 5.0 per cent of the weight of angelica lactone usually being sufficient.

Dimers of angelica lactone, according to our above mentioned copending application, can be prepared as follows:

Preparation of dimers of angelica lactone with sodium methoxide catalyst

One hundred parts of beta angelica lactone was mixed with 2 parts of dry finely powdered sodium methoxide in a vessel equipped with a mechanical stirrer. While being stirred, the mixture was heated to about 80° C. and held at that temperature for about 30 minutes, during which time the catalyst slowly dissolved. The reaction solution was then cooled to about room temperature, neutralized with cold dilute aqueous hydrochloric acid, and separated from the aqueous phase. The separated water layer was extracted with chloroform, and the chloroform extract was combined with the organic liquid separated from the neutralized reaction mixture. The combined extract and main reaction product were then distilled through a short fractionating column, first under the reduced pressure of a water aspirator to remove chloroform, and then at a receiver pressure of about 3 mm. of mercury. The bulk of the reaction solution distilled over the temperature range of 215 to 230° C. About 61 parts of this fraction was obtained.

The fraction distilling at 215 to 230° C. at 3 mm. was diluted with about an equal volume of dry methanol and allowed to stand overnight in a refrigerator at about 5° C. to induce crystallization. The crop of crystals thus obtained was separated from mother liquor, washed with a small volume of cold methanol, and dried. The colorless crystalline product melted at 83 to 84° C., after recrystallization from ethanol or benzene, and its yield amounted to 38 parts or 62 per cent of the collected fraction.

The saponification equivalent of the product melting at 83 to 84° C. was found to be about 98, and warm acidification of its saponification solution yielded a saturated lactone acid which, after purification by recrystallization from water, had a melting point of about 123 to 124° C., a neutralization equivalent of about 214, and a saponification equivalent of about 107. Cryoscopic determination of the molecular weight of the product melting at 83 to 84° C., using camphor, gave a value of 232, and analyses for carbon and hydrogen showed that the compound contained 6.36 per cent hydrogen and 61.3 per cent carbon (calculated for dimeric angelica lactone: mol. wt. 196, carbon 61.2 per cent, hydrogen 6.12 per cent). This elementary composition and approximate molecular weight indicates a molecular formula of $C_{10}H_{12}O_4$.

Determinations of saponification equivalent, molecular weight, and elementary composition made of the liquid residue remaining after separating the crop of crystalline material from the fraction distilling at 215 to 230° C. at 3 mm. gave substantially the same values as those found for the crystalline product. Acidification of the saponified liquid residue yielded a less soluble lactone acid which, after recrystallization from water, had a neutral equivalent of about 214, a saponification equivalent of about 107, and a melting point of 155 to 156° C. The determined elementary compositions and approximate molecular weights of both lactone acids indicate that their common molecular formula is $C_{10}H_{14}O_5$.

Substitution of other alkali alkoxides for sodium methoxide in this example, such as sodium ethoxide, sodium butoxide, or the corresponding alcoholates of potassium and lithium, yields similar results. Use of alpha angelica lactone with alkali alkoxides under the conditions of this example provided lower yields of the dilactones, but otherwise the results were similar to those obtained with the beta form.

*Preparation of dimers of angelica lactone with sodium metal catalyst*

One hundred parts of beta angelica lactone was stirred for 5 hours at about 80° C. with about 1 per cent of finely divided metallic sodium, and the reaction solution was then worked up for dimeric lactones as described above. There was thus obtained 64 parts of a liquid product boiling at 215 to 225° C. at a receiver pressure of about 3 mm. of mercury. From this, also as described above, there was isolated 41 parts of pure crystalline dimer melting at 87° to 88° C. The solid dimer and the liquid residue had identical saponification equivalents.

Dimerization of alpha angelica lactone with sodium metal under the conditions of this example gave about 40 per cent of mixed dimers.

Other alkali metals, such as potassium and lithium, may be successfully used in place of sodium for dimerizing angelica lactone according to this example.

The ethylenic double bond in the dimers may be hydrogenated at moderate temperatures and hydrogen pressure with the aid of a suitable catalyst such as Raney nickel or platinum oxide. Preferably the dimers are dissolved in an inert solvent prior to hydrogenation. Glacial acetic acid and ethanol are suitable solvents for this purpose.

The novel saturated dilactones obtained by hydrogenation are viscous oils distilling at a temperature of about 190° C. at a receiver pressure of about 2 mm. of mercury. Both of their lactone rings may be opened with excess alkali to yield a strongly alkaline stable solution of the alkali salt of a dicarboxylic acid. If the excess alkali in the solution is quickly neutralized at about 0° C., and the solution thus neutralized is allowed to stand, it will slowly become more alkaline, faster on heating, until a maximum of one-half of the alkali consumed during saponification is liberated. Acidification of the alkaline solution thus obtained, or of the original strongly alkaline solution of saponified dilactone, yields the starting saturated dilactone. This behavior shows that one of the lactone rings, after being opened, has a greater tendency to close than the other one, and that the stable form of the molecule in a moderately alkaline solution is the alkali salt of a lactone acid.

The saturated dilactones are potentially useful as plasticizers for assorted films and coatings, and as intermediates in the preparation of medicinal and other compounds. They are also potentially useful as sources of derivatives of their corresponding lactone acids and dicarboxylic acids.

The following examples describe in more detail the preparation of the unsaturated dilactones.

*Example 1.—Hydrogenation of the low-melting dimer of angelica lactone*

A solution of 100 parts of angelica lactone dimer melting at 83 to 84° C. in 300 parts of ethanol was shaken at room temperature with Raney nickel catalyst and hydrogen at an initial hydrogen pressure of 40 pounds per square inch. Absorption of hydrogen was completed in about 15 minutes and amounted to one mol of hydrogen per mol of dimer. Removal of solvent and catalyst from the reaction mixture followed by distillation of the residual product through a short column at a receiver pressure of about 2 mm. of mercury yielded 96 parts of a viscous oil boiling between about 188 to 192° C. The distilled product was found to have a saponification equivalent of about 99, and its density and refractive index, measured at 20° C., were found to be 1.214 and 1.487, respectively. Its cold neutralized saponification slowly liberated alkali on standing, faster on warming, until a maximum of one-half of the alkali consumed during saponification was released. Acidification of the alkaline solution thus obtained regenerated the hydrogen dimer. Acidification of the alkaline solution of saponified material also regenerated the hydrogenated dimer. Analyses of the substance for its carbon and hydrogen contents and cryoscopic determination of its molecular weight indicated that the hydrogenation product had the molecular formula of $C_{10}H_{14}O_4$.

*Example 2.—Hydrogenation of the high-melting dimer of angelica lactone*

A solution of 100 parts of angelica lactone dimer melting at 87 to 88° C., prepared as described in a copending application, was hydrogenated and worked up for reaction product as described in the foregoing example. There was thus obtained 95 parts of a viscous oil having very nearly the same physical properties as those exhibited by the hydrogenated low-melting dimer. It distilled between about 188 to 192° C. at a receiver pressure of about 2 mm. of mercury, its density and refractive index, at 20° C., were found to be 1.216 and 1.488, respectively, and its determined elementary composition and molecular weight indicated a molecular formula of $C_{10}H_{14}O_4$. The behaviors of its cold neutralized and acidified saponification solutions paralleled those of the hydrogenated lower melting dimer.

Despite the close similarity of their physical properties, the hydrogenated dimers are not believed to be identical compounds. It is possible, however, that the original dimers of angelica lactone are diastereoisomers of such nature that they yield identical compounds upon hydrogenation.

All temperatures recited hereinbefore and in the appended claims were determined with an ordinary grade of laboratory mercury thermometer.

The expression "receiver pressure" is used throughout the description and claims to indicate that recited distillation pressures were measured at the vessel receiving the condensed liquid. Owing to the fairly high vapor velocities occurring in the passages of distillation apparatus during low pressure distillation of liquids therein, and to the consequent drop in vapor pressure in the direction of vapor flow, the true distillation pressure, i. e., the vapor pressure immediately above the boiling liquid, will be somewhat greater than the pressure above the condensed liquid in the receiver.

The descriptive term "saturated" as applied herein to chemical compounds signifies that the compounds contain no carbon-to-carbon or ethylenic double bond.

Since certain changes may be made in the above product and different embodiments of the invention could be made without departing from the scope thereof, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. Hydrogenated angelica lactone dimer.
2. Hydrogenated angelica lactone dimer, said dimer having a melting point in the range of 83–84° C.
3. Hydrogenated angelica lactone dimer, said dimer having a melting point in the range of 87–88° C.

HANS WOLFF.
WENDELL W. MOYER.

REFERENCES CITED

The following references are of record in the file of this patent:

UNITED STATES PATENTS

| Number | Name | Date |
|---|---|---|
| 2,163,109 | Spanagel | June 20, 1939 |
| 2,361,036 | Kung | Oct. 24, 1944 |
| 2,362,408 | Ruzicka | Nov. 7, 1944 |

OTHER REFERENCES

Beilstein: vol. XVII, pages 252 and 253.
Marvel et al., J. A. C. S., vol 61, July 1939, pages 1682–1684